United States Patent

[11] 3,610,958

[72] Inventor Paul A. Reiling
New Providence, N.J.
[21] Appl. No. 825,552
[22] Filed May 19, 1969
[45] Patented Oct. 5, 1971
[73] Assignee Bell Telephone Laboratories Incorporated
Murray Hill, N.J.

[54] SAMPLE AND HOLD CIRCUIT
9 Claims, 2 Drawing Figs.

[52] U.S. Cl. .......... 307/238,
307/246, 307/294, 328/151
[51] Int. Cl. .......... G11c 11/34
[50] Field of Search .......... 328/151;
307/239, 246, 294, 238

[56] References Cited
UNITED STATES PATENTS

| | | | |
|---|---|---|---|
| 3,333,117 | 7/1967 | Carter | 307/294 X |
| 3,072,854 | 1/1963 | Case, Jr. | 328/151 |
| 3,210,558 | 10/1965 | Owen | 307/246 |
| 3,292,010 | 12/1966 | Brown et al. | 307/246 |
| 3,502,992 | 3/1970 | Cooperman | 328/151 |

*Primary Examiner*—Donald D. Forrer
*Assistant Examiner*—B. P. Davis
*Attorneys*—R. J. Guenther and Kenneth B. Hamlin

ABSTRACT: In a sample and hold circuit the fixed contacts of a double-throw switch are connected to the terminals of a storage capacitor. The movable contact of the double-throw switch is connected to ground, and the capacitor is connected to a source of input signals. When the switch is in one position, the input signal is sampled. When the switch is in the other position, the discharge path for the capacitor is blocked, and the signal sample is held thereon. Activation of the double-throw switch may be from a grounded or unbalanced source, and hence, there being no need for pulse transformers or similar circuitry, the entire circuit can be constructed readily using thin film or integrated circuit techniques.

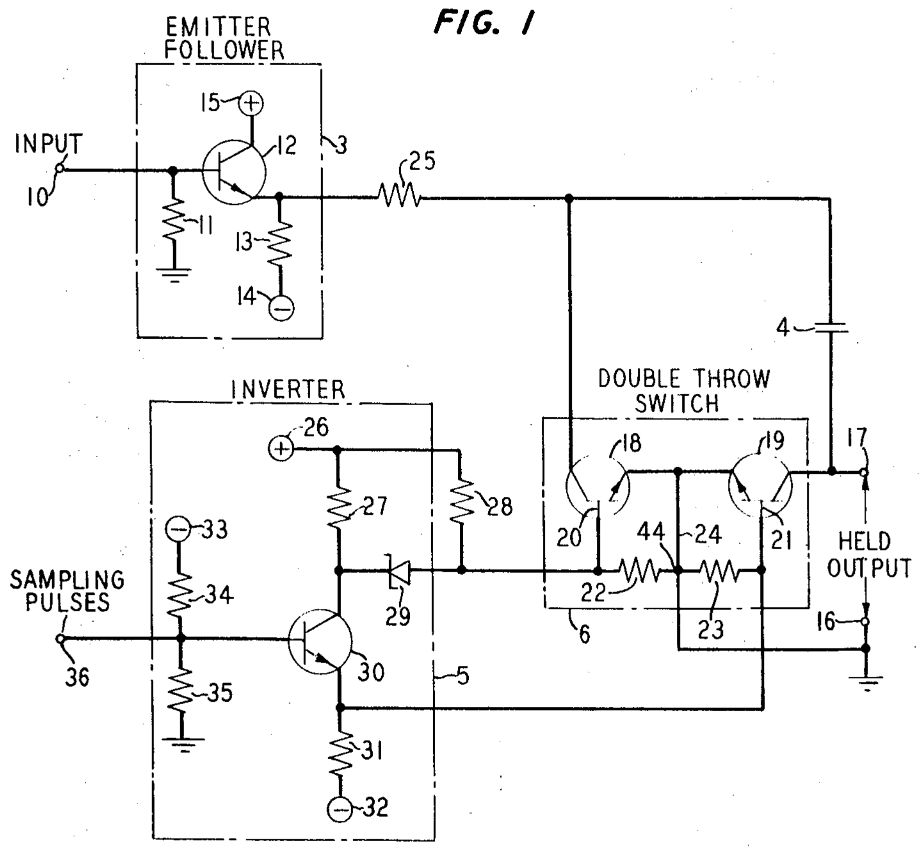
FIG. 2
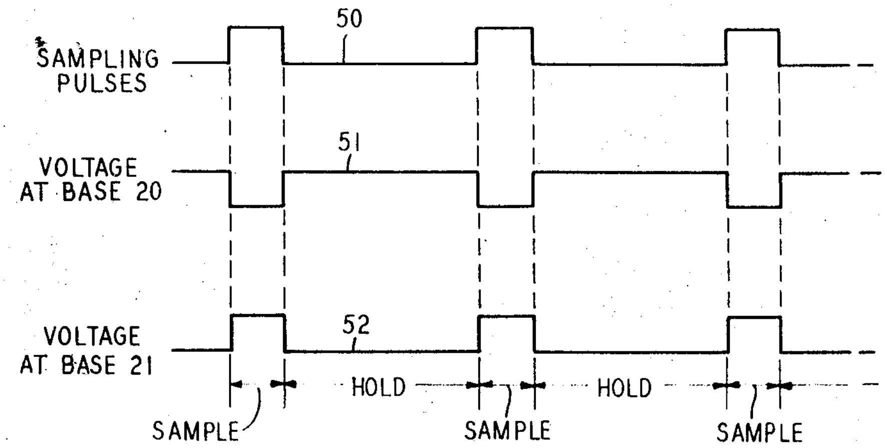
INVENTOR
P. A. REILING
BY D. J. Snedeker
ATTORNEY

SAMPLE AND HOLD CIRCUIT

BACKGROUND OF THE INVENTION

1. Field of the Invention

This relates to sample and hold circuits and particularly to sample and hold circuits which are readily integrable.

2. Description of the Prior Art

Sample and hold circuits are employed in many areas of electronics, particularly in information conversion systems such as analog-to-digital converters. Sample and hold circuits generally comprise a capacitor which is charged by an analog input signal during the sampling operation and which is electrically isolated from the analog input signal during the hold operation. In a typical prior art embodiment a source of input signals is connected across the terminals of the capacitor and one side of the capacitor is grounded. A switch is connected between the other terminal of the capacitor and the source of input signals such that the capacitor can be alternately charged during the sampling period and isolated from the source during the hold period. This switch is customarily activated by a sampling pulse source which must be isolated from ground or by a balanced arrangement which must be properly adjusted to prevent residual currents. Otherwise, the sampling pulses may contribute to the magnitude of voltage stored on the capacitor and hence result in inaccurate sampling of the input signal. Accordingly, prior art sample and hold circuits generally comprise a sampling pulse source which is isolated from ground, such as through the use of a pulse transformer.

Since pulse transformers and other known isolated sampling pulse sources are not readily amenable to integrated circuit techniques, it has been difficult to provide sample and hold circuits in the form of integrated circuits or thin film assemblies. Application of integrated circuit or thin film techniques to the construction of sample and hold circuits, therefore, necessitates overcoming the need for an isolated or balanced supply of sampling pulses to activate the switching element.

SUMMARY OF THE INVENTION

Accordingly, it is an object of this invention to provide a sample and hold circuit which does not require a source of sampling pulses isolated from ground.

It is another object of this invention to provide a sample and hold circuit which does not require balanced sampling pulses.

It is another object of this invention to eliminate the need for pulse transformers in sample and hold circuits.

It is another object of this invention to provide a simplified sample and hold circuit which is readily amenable to construction by integrated circuit or thin film techniques.

These and other objects are achieved in a sample and hold circuit according to this invention in which the terminals of a storage capacitor are connected to the "fixed contacts" of a double-throw switch, illustratively a transistor switch, whose "movable contact" is grounded. When the switch is in one position, the capacitor is connected across the source of input signals, and a sample of the input signal is stored on the capacitor. At the end of the sampling operation the double-throw switch is thrown to its other position, thereby grounding the other terminal of the storage capacitor and isolating it from the source of input signals. Thus, the signal held on the storage capacitor is reversed in phase from the input signal, but this can be corrected readily, if desired, by the provision of a signal inverter in the input or output circuitry. At the end of the hold operation, the double-throw switch is returned to its original position and a new sample of the input signal is stored on the storage capacitor. Since all that is required for switching is alternate grounding of the capacitor terminals, the double-throw switch can be triggered from one position to the other by an unbalanced or ungrounded source of pulses without affecting the accuracy of the sampling operation. Accordingly, the entire sample and hold circuit is readily susceptible to integrated circuit or thin film techniques of construction.

BRIEF DESCRIPTION OF THE DRAWING

The objects and features of a sample and hold circuit constructed in accordance with this invention may become fully apparent upon consideration of the following detailed description and the accompanying drawing, in which:

FIG. 1 is a schematic diagram of an illustrative embodiment of a sample and hold circuit constructed in accordance with the invention;

FIG. 2 shows several waveforms useful in describing the operation of the sample and hold circuit of FIG. 1;

DETAILED DESCRIPTION

Figure 3:
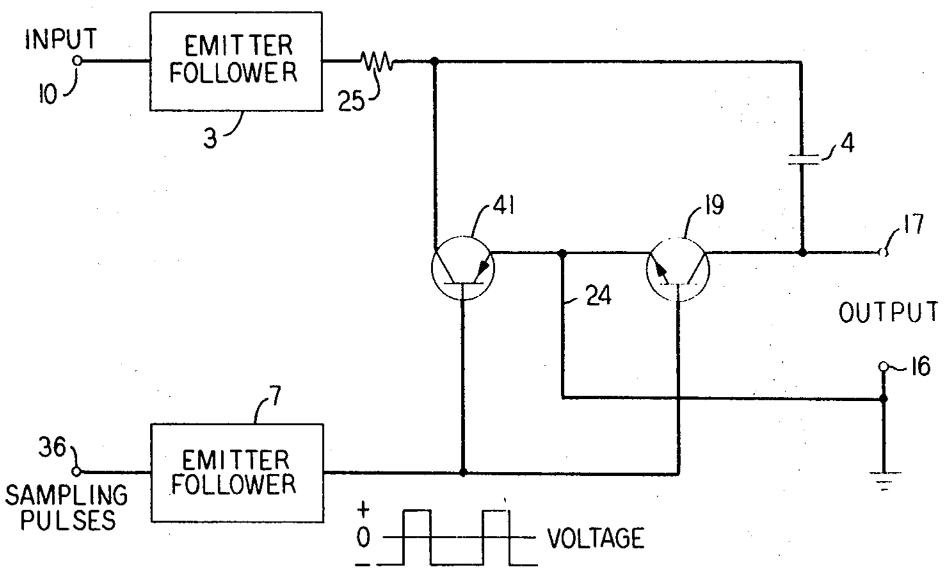
FIG. 3 shows and illustrative embodiment of a sample and hold circuit according to the invention employing complementary transistors.

The sample and hold circuit shown in FIG. 1 comprises storage capacitor 4 and double-throw switch 6 which includes switching transistors 18 and 19. The analog input signal is applied at input terminal 10 which is connected to emitter follower input circuit 3. Input terminal 10 is thus connected to the base of transistor 12 and through resistor 11 to ground in emitter follower circuit 3. The collector of transistor 12 is connected to positive voltage source 15 and the emitter of transistor 12 is connected through resistor 13 to negative voltage source 14. Emitter follower input circuit 3 is thus a standard variety of input circuit, depicted by way of illustration in the embodiment of FIG. 1, and it will be appreciated that other varieties of input circuits could also be used.

The emitter of transistor 12 in input circuit 3 is connected through load resistor 25 to one terminal of storage capacitor 4. The other terminal of storage capacitor 4 is connected to output terminal 17 and, as shown, the output of the circuit is provided between output terminal 17 and output terminal 16, which is grounded. The two terminals of storage capacitor 4 are connected to double-throw switch 6, which comprises switching transistors 18 and 19. One side of capacitor 4 is connected to the collector of transistor 18 and the other side of capacitor 4 is connected to the collector of transistor 19, the respective collectors corresponding to the "fixed contacts" of the switch 6. The emitters of transistors 18 and 19 are interconnected via conduction path 24 to ground. Base 20 of transistor 18 and base 21 of transistor 19 are connected through respective resistors 22 and 23 to point 44, which is connected to ground, point 44 corresponding to the "movable contact" of switch 6.

Bases 20 and 21 of transistors 18 and 19, respectively, are also connected to inverter circuit 5, base 20 being connected via resistor 28 to positive source 26 and base 21 being connected via resistor 31 to negative source 32. Base 20 is further connected via Zener diode 29 to the collector of transistor 30 in inverter circuit 5, Zener diode 29 being poled in the direction of the collector of transistor 30. Base 21 of transistor 19 is connected to the emitter of transistor 30. Positive source 26 is connected through resistor 27 to the collector of transistor 30. To complete the structure of inverter circuit 5, the base of transistor 30 is connected to terminal 36 to which sampling pulses are applied to operate the sample and hold circuit. Terminal 36 is also connected via resistor 34 to negative voltage source 33 and via resistor 35 to ground.

In operation, an analog signal which is to be sampled and held is applied at input terminal 10 of the sample and hold circuit in FIG. 1, and a sequence of sampling pulses are applied at terminal 36. In accordance with an important aspect of this invention, the sampling pulses applied at terminal 36 advantageously may be from a grounded or unbalanced source. When no sampling pulse is present at terminal 36, a current flows from ground through resistors 34 and 35 to negative source 33, thereby maintaining the base of transistor 30 negative and insuring that transistor 30 is OFF, that is, nonconductive. Since transistor 30 is OFF, no current can flow therethrough between positive source 26 and negative source 32. A current flows from negative source 32 through resistors 31 and 23 to ground, the magnitudes of resistors 31 and 23 being such that base 21 is maintained at a negative voltage level and transistor 19 is biased OFF. Similarly, a current flows from positive source 26 through resistors 28 and 22 to ground, the magnitudes of resistors 28 and 22 being such that base 20 is maintained at a positive voltage level and transistor 18 is biased ON. Thus, with no sampling pulse applied at terminal 36, transistor 18 is ON and one side of capacitor 4 connected to input terminal 10 is grounded therethrough. Transistor 19, however, is OFF and the other side of capacitor 4 connected to output terminal 17 is floating.

The analog input signal applied to input terminal 10 is directed to emitter follower input circuit 3 which operates in a well-known manner to provide an output signal voltage proportional to the analog input signal voltage applied to terminal 10. Thus, as the voltage at input terminal 10 increases, the base voltage of transistor 12 increases, and transistor 12 conducts a larger current from positive source 15 to negative source 14 through resistor 13. With greater current flowing through resistor 13, the voltage at the emitter of transistor 12 increases and this is reflected as a corresponding increased output voltage from emitter follower input circuit 3. Conversely, when the voltage at input terminal 10 decreases, less current flows through resistor 13 and the output voltage of emitter follower circuit 3 decreases. With no sampling pulse at terminal 36, transistor 18, as described above, is ON, and the voltage output of emitter follower input circuit 3 results in a current flowing through load resistor 25 and transistor 18 to ground. Thus, no charge is stored on capacitor 4.

To sample the input signal appearing at terminal 10, a positive sampling pulse is applied to terminal 36. This turns transistor 30 ON, and a current flows from positive source 26 through resistor 27, transistor 30, and resistor 31 to negative source 32. Current flow through resistor 27 decreases the voltage at the collector of transistor 30, and this decrease is transmitted via Zener diode 29 to base 20 and transistor 18. The additional current through resistor 31 increases the voltage at the emitter of transistor 30, and this increase is transmitted to base 21 of transistor 19. The relationship between the voltages at bases 20 and 21 with respect to the voltage at terminal 36 is depicted by waveforms 50, 51, and 52 of FIG. 2. WAVEFORM 50 shows positive sampling pulses applied at terminal 36 during successive sampling periods, and waveforms 51 and 52 show respectively the voltage decrease at base 20 and the voltage increase at base 21 during each sampling pulse period.

The above-described voltage changes at bases 20 and 21 in the presence of a sampling pulse applied to terminal 36 turn transistor 18 OFF and transistor 19 ON. Accordingly, a path is established from emitter follower input circuit 3 through load resistor 25, capacitor 4, and transistor 19 to ground, and capacitor 4 begins to charge. The time constant of resistor 25 and capacitor 4 is short compared to the duration of the sampling pulse. Thus, before the termination of the sampling pulse at terminal 36, the voltage across capacitor 4 reaches the output voltage of emitter follower input circuit 3. Thus, a voltage sample proportional to the analog input signal voltage at input terminal 10, is stored on capacitor 4 during the sampling period.

As shown in FIG. 2, the hold operation begins with the termination of the sampling pulse at terminal 36. In the manner described above, when the sampling pulse at terminal 36 ceases, transistor 30 is turned OFF. This turns transistor 18 ON and transistor 19 OFF. With transistor 19 OFF, there is no discharge path for capacitor 4, and except for some possible slight leakage through the utilization circuitry (not shown) connected between terminal 17 and ground, the sampled voltage is held on capacitor 4. Load resistor 25 is selected to be large enough such that during the hold operation excessive direct current does not flow from emitter follower input circuit 3 through transistor 18 to ground. In addition, the magnitude of load resistor 25 prevents the input signal from appearing at the output during the hold operation.

To terminate the hold operation and again sample the analog input signal at terminal 10, another sampling pulse is applied at terminal 36, thereby turning transistor 18 OFF and transistor 19 ON. In the manner described above a new sample of the input signal is then registered and held on capacitor 4.

An illustrative embodiment of a sample and hold circuit using complementary transistor is shown in FIG. 3, wherein components identical to those shown in FIG. 1 are identified by like reference numerals. Input terminal 10 is connected via emitter follower circuit 3 and load resistor 25 to one terminal of capacitor 4. The other terminal of capacitor 4 is connected to output terminal 17 and to the collector of NPN transistor 19. The sampled output signal is obtained between output terminal 17 and output terminal 16, which is grounded. The emitter of NPN transistor 19 is connected to ground via conduction path 24.

In place of NPN transistor 18 in FIG. 1, PNP transistor 41 is connected between the one terminal of capacitor 4 and ground via conduction path 24. The bases of transistors 41 and 19 are connected to the output of emitter follower circuit 7, which, as shown in FIG. 1 has a negative quiescent output and provides positive output pulses in response to sampling pulses applied at terminal 36. Emitter follower circuit 7 is substantially identical in construction to emitter follower circuit 3 described above in connection with FIG. 1.

The negative quiescent output level of emitter follower circuit 7 maintains PNP transistor 41 ON and NPN transistor 19 OFF. When a sampling pulse is applied at terminal 36, emitter follower circuit 7 provides a positive pulse to the bases of transistors 19 and 41 which turns transistor 41 OFF and transistor 19 ON. Thus, in the manner described above in connection with the embodiment of FIG. 1, a sample of the analog input signal appearing at terminal 10 is stored on capacitor 4. At the termination of the sampling pulse, the output of emitter follower circuit 7 falls to a negative level, thereby turning transistor 41 ON and transistor 19 OFF. Accordingly, the sample of the input signal is held on capacitor 4 until the next sampling pulse appears at terminal 36, at which time the sampling process is repeated.

In some applications it is desired to sample at a rate greater than that at which the switching circuit, such as transistor 41 and 19 in FIG. 3, is capable of operating. For such applications the effective sampling rate can be doubled by using two sample and hold circuits of the type shown in FIG. 1 or in FIG. 3 connected in parallel between input terminal 10 and output terminal 17, an OR gate being interconnected between the two circuits and output terminal 17. The sampling pulse trains applied to the respective sample and hold circuits advantageously would be square waveforms 180° out of phase with one another such that when one sample and hold circuit is registering an input signal sample on its storage capacitor the other circuit is holding the sample previously registered on its storage capacitor, and vice versa. Thus a held sample of the input signal is alternately provided to the output terminal by first one and then the other of the two parallel sample and hold circuits, thereby effectively doubling the rate of sampling. For example, if the individual sampling pulse trains were provided at 150 MHz. the effective sampling rate for the overall arrangement would be 300 MHz.

Figure 4:
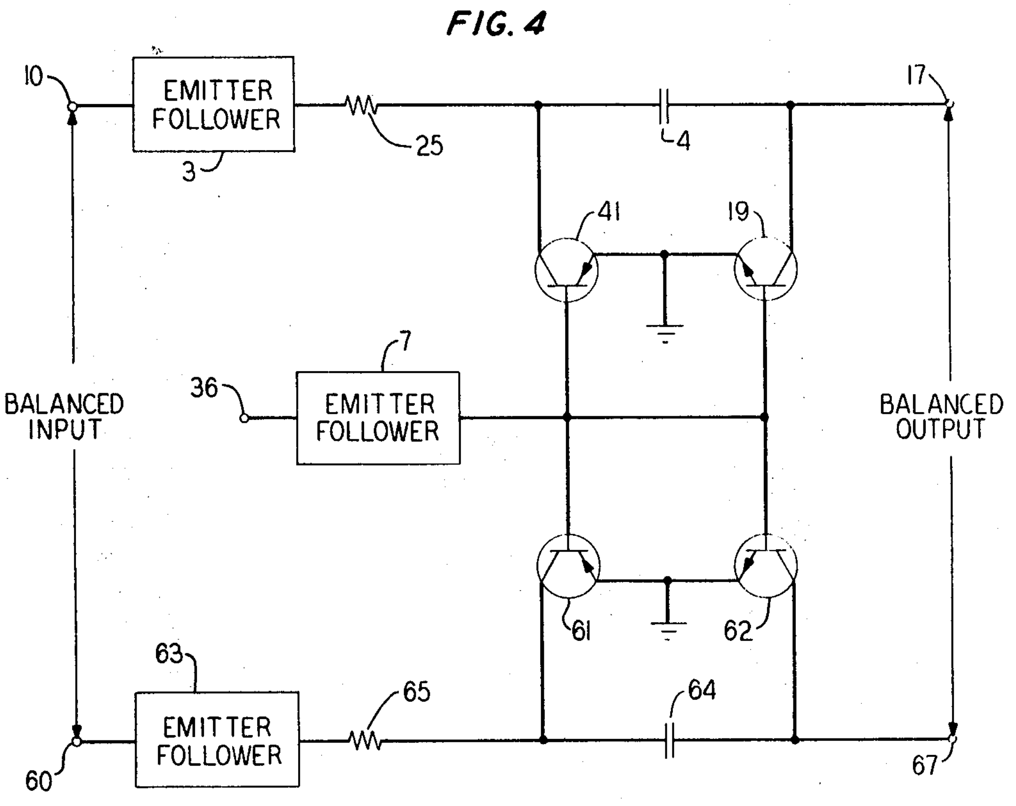
FIG. 4 shows another illustrative embodiment of a sample and hold circuit according to the invention.

A pair of sample and hold circuits of the type shown in FIGS. 1 and 3 may also be employed in an arrangement for sampling and holding a balanced analog input signal such as shown in FIG. 4. The structure of FIG. 3 included in the circuit of FIG. 4 is designated by like reference numerals. The output of emitter follower circuit 7 in FIG. 4 is connected also to the bases of a second pair of complementary transistors 61 and 62, the collector of transistor 61 being connected through resistor 65 to emitter follower circuit 63 and the collector of transistor 62 being connected to output terminals 67. A second storage capacitor 64 is connected between the collectors of transistors 61 and 62. FIG. 4 thus shows a symmetrical sample and hold circuit arrangement having a balanced analog input signal applied between input terminals 10 and 60 and providing a balanced output between output terminals 17 and 67.

The operation of the sample and hold circuit in FIG. 4 is similar to that described above for the circuit shown in FIG. 3. The analog input signal is applied across terminals 10 and 60, and is stored on capacitors 4 and 64 during the period of each sampling pulse applied at terminal 36. During the period of a sampling pulse applied at terminal 36, transistors 19 and 62 are ON and transistors 41 and 61 are OFF. In the hold period between sampling pulses, transistors 41 and 61 are ON and transistors 19 and 62 are OFF. Thus the balanced input signal samples stored on capacitors 4 and 64 are held, and a balanced output signal appears across output terminals 17 and 67.

It will be apparent from the above descriptions of FIGS. 1, 3 and 4 that the sampling pulses applied to terminal 36 advantageously may be supplied from an unbalanced or ungrounded source according to the present invention. Accordingly, no additional components, such as pulse transformers, are required for operation of the sample and hold circuit, and the entire circuit may readily be constructed using integrated circuit or thin film techniques.

What is claimed is:

1. A sample and hold circuit comprising a storage capacitor having first and second terminals, a double-throw switch, the fixed contacts of said switch being connected to said first and second terminals and the movable contact of said switch being connected to ground potential, means for operating said double-throw switch between the two positions thereof to respectively hold said first and second terminals at ground potential, said capacitor storing charge when said switch is in one position holding said first terminal at ground potential for a predetermined sampling period, and holding the stored charge when said switch is in its other position holding said second terminal at ground potential, and means including said storage capacitor for providing said sample and hold circuit with a time constant which is substantially shorter than said sampling period.

2. A sample and hold circuit as in claim 1 wherein said double-throw switch comprises a first normally ON transistor connected between said first terminal and ground and a second, normally OFF transistor connected between said second terminal and ground, said first and second transistors being switched by said operating means to OFF and ON conditions, respectively, during the sampling operation of said circuit.

3. A sample and hold circuit as in claim 2 wherein said operating means comprising an inverter circuit connected to the bases of said first and second transistors, and means for applying sampling pulses to said inverter circuit.

4. A sample and hold circuit as in claim 3 wherein said inverter circuit comprises a third transistor, a first resistor, a second resistor, and a first and second voltage sources, the collector of said third transistor being connected through said first resistor to said first voltage source, the emitter of said third transistor being connected through said second resistor to said second voltage source, and the base of said third transistor being connected to said sampling pulse applying means.

5. A sample and hold circuit comprising, a storage capacitor having first and second terminals; a double-throw switch, the fixed contacts of said switch being connected to said first and second terminals and the movable contact of said switch being connected to ground potential, said switch comprising a first normally ON transistor connected between said first terminal and ground potential and a second normally OFF transistor connected between said second terminal and ground potential; and inverter circuit comprising a third transistors, the collector of which is connected to the base of said first transistor, and the emitter of which is connected to the base of said second transistor, a first resistor, a second resistor, and first and second voltage sources, the collector of said third transistor being connected through said first resistor to said first voltage source, and the emitter of said third transistor being connected through said second resistor to said second voltage source; means connected to the base of said third transistor for applying sampling pulses to said inverter circuit; and means including said inverter circuit and said sampling pulse applying means for operating said double-throw switch between the two positions thereof to respectively hold said first and second terminals at ground potential by switching said first and second transistors to OFF AND ON conditions, respectively, during the sampling operation of said circuit, said capacitor storing charge when said switch is in one position holding the stored charge when said switch is in its other position holding said second terminal at ground potential.

6. A sample and hold circuit as in claim 5 further comprising an input circuit, and a load resistor connecting said input circuit to said first terminal of said capacitor.

7. A sample and hold circuit comprising a double-throw switch including a pair of transistors of opposite conductivity type, a storage capacitor connected between the collectors of said pair of transistors, means for applying input signals to be sampled to one plate of said storage capacitor, means connecting the emitters of said pair of transistors to ground potential, means for applying sampling pulses to the bases of said pair of transistors, and output means connected to the other plate of said storage capacitor.

9. A sample and hold circuit in accordance with claim 7 wherein said input signals to be sampled are balanced input signals, the combination further comprising a second pair of opposite conductivity type transistors, a second storage capacitor connected between the collectors of said second pair of transistors, means for applying said input signals to one plate of said second storage capacitor, means connecting the emitters of said pair of transistors to ground potential, said sampling pulse means applying said sampling pulses to the bases of said second pair of transistors and output means connected to the other plate of said second storage capacitor.

9. A sample and hold circuit comprising first and second circuits having respective storage capacitors, means for applying input signals to be sampled in common to said first and second circuits, means for operating said first and second circuits to store successive samples of said input signals alternately on said respective storage capacitors of said first means including said operating means for directing a sample previously stored on the storage capacitor of said first circuit to said output means concurrently with the storage of a sample of said input signals on the storage of a sample of said input signals on the storage capacitor of said second circuit and vice versa.